J. J. Gwynn,
Steam Cut-Off.
N° 30,676. Patented Nov. 20, 1860.
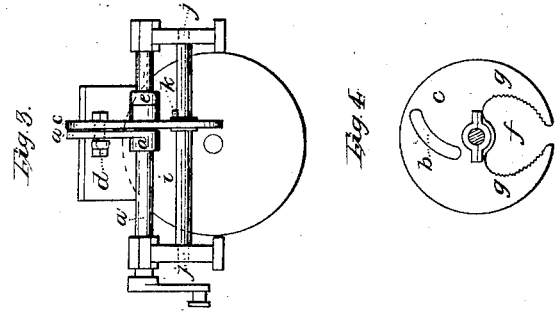
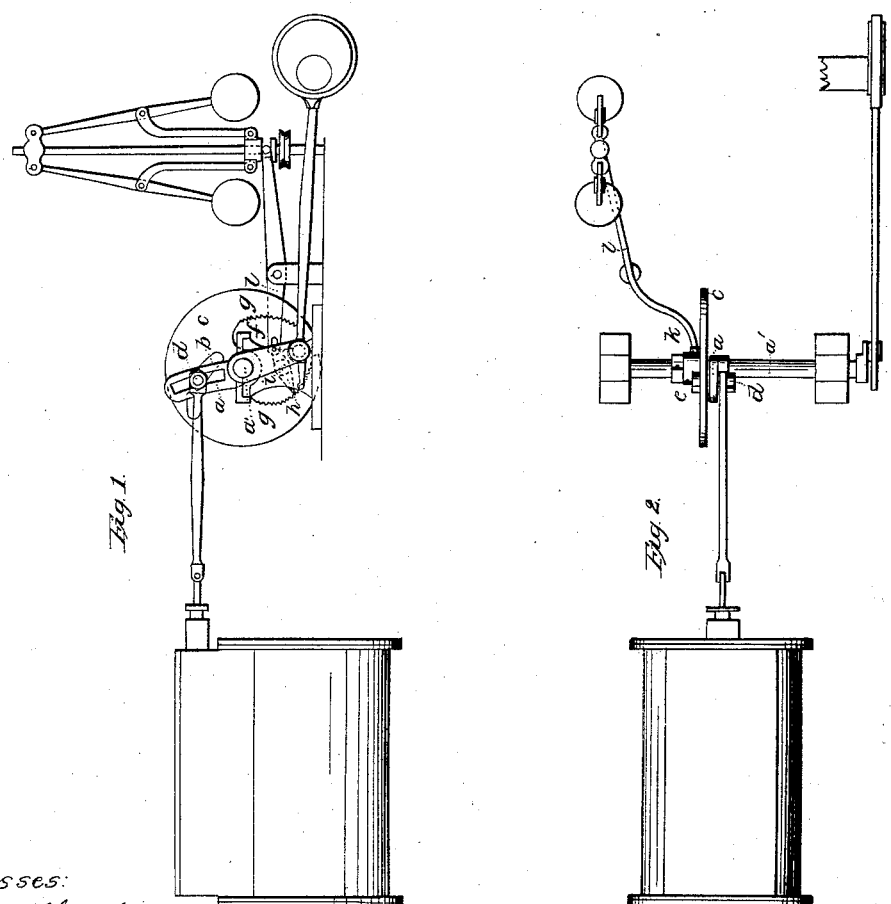
Witnesses:
George A Lloyd
Joseph Pullyn
Inventor:
John J Gwynn

UNITED STATES PATENT OFFICE.

JOHN J. GWYNN, OF PLAINFIELD, NEW JERSEY.

VALVE-GEAR OF STEAM-ENGINES.

Specification of Letters Patent No. 30,676, dated November 20, 1860.

*To all whom it may concern:*

Be it known that I, JOHN J. GWYNN, of Plainfield, in the county of Union and State of New Jersey, have invented certain new and useful Improvements in Valve-Gear of Steam-Engines; and I do hereby declare that the following is a full and correct description thereof, reference being had to the annexed drawings, forming part of this specification, and to the letters of reference thereon.

Figure 1 of the drawing is a side elevation. Fig. 2 a plan view. Fig. 3 a front view of rock shaft &c. Fig. 4 detached view of a modification of friction cam plate.

The first part of my invention consists in a means of varying the throw of the steam valve.

Letter, $a$, represents a slotted arm fast to the rock shaft $a'$.

Letter, $b$, is a curved cam slot in the friction plate, $c$, which turns freely on the rock shaft. The valve wrist-pin, $d$, passes through both the slot in the rock shaft arm and the curved cam slot in the friction plate, the relative position of the wrist-pin in the slotted arm being determined by the curved cam slot in the friction plate. For the purpose of holding the wrist-pin in place, sufficient friction is made by the screw, $e$, on the rock shaft, which brings the surface of the friction plate against the side of the slotted arm.

It will be observed that owing to the relative inclination of the cam slot the main force exerted in moving the valve is borne by the slotted arm and that therefore the friction plate is abundantly able to hold the wrist-pin in place, the friction plate moving with the rock shaft unless when arrested for the purpose of shifting the position of the wrist-pin. The friction plate may be constructed with a bearing box, as shown in Fig. 4, and clamped on the rock shaft the friction in that case being on the rock shaft instead of against the side of the slotted arm.

The second part of my invention consists in combining the governor of a steam engine with the above-described mechanism, substantially for the purpose of automatically regulating the position of the wrist-pin, and consequently proportioning the supply of steam, admitted to the cylinder through the ports to the variation of power required to be exerted by the engine at a uniform rate of speed.

In the lower half of the friction plate is a heart shaped opening, $f$, so placed with relation to the axis of the friction plate and to the curved cam slot that a right line representing the diameter of the friction plate will divide both the curved cam slot and the heart shaped opening into two equal parts.

The opposite sides of the heart shaped opening are provided with ratchet teeth, $g$, which are acted on by the double pawl, $h$, which is fast to the shaft, $i$, which shaft oscillates in bearings at, $j, j$, underneath the rock shaft. The pawl, $h$, is connected with the governor by the pin, $k$, and slotted lever, $l$. The governor deriving motion in any convenient manner from the steam engine controls and regulates the position of the pawl, varying it as the speed of the engine varies, and as the friction plate oscillates with the rock shaft the ratchet teeth on one or the other of the sides of the heart shaped opening engage with the pawl and thereby move the friction plate, either raising or lowering the wrist-pin, and consequently altering the throw of the valve, admitting steam to the cylinder through the ports as required to preserve a uniform rate of speed of the engine.

It will be evident that the devices above described can be applied to the wrist-pin of the eccentric rod with the same effect and without altering the principle of my invention.

What I claim as my invention and improvement in valve gear of steam engines is as follows, viz:

1. The friction cam plate in combination with the slotted arm and movable wrist-pin substantially as described.

2. In combination with the governor of a steam engine the movable wrist-pin slotted arm, friction cam plate, ratchet and pawl substantially as described and substantially for the purposes hereinbefore set forth.

JOHN J. GWYNN.

Witnesses:
GEORGE A. LLOYD,
E. S. JOHNSON.